Oct. 28, 1952 C. E. REID, SR 2,615,262
CUTTING ATTACHMENT FOR LAND-CLEARING EQUIPMENT
Filed Sept. 8, 1950 2 SHEETS—SHEET 1
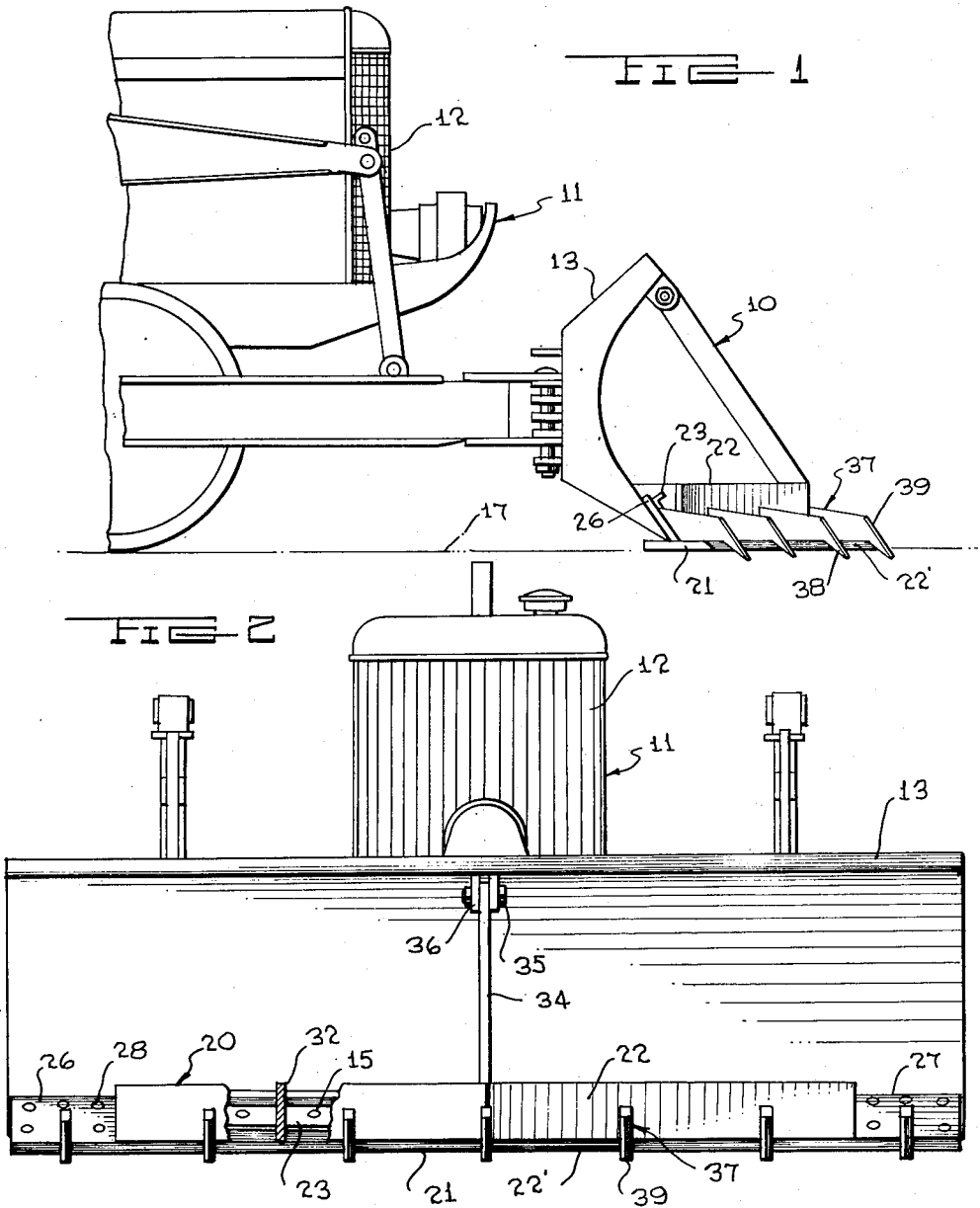
INVENTOR.
CHARLES E. REID, Sr.
BY
McMorrow, Berman & Davidson
ATTORNEYS

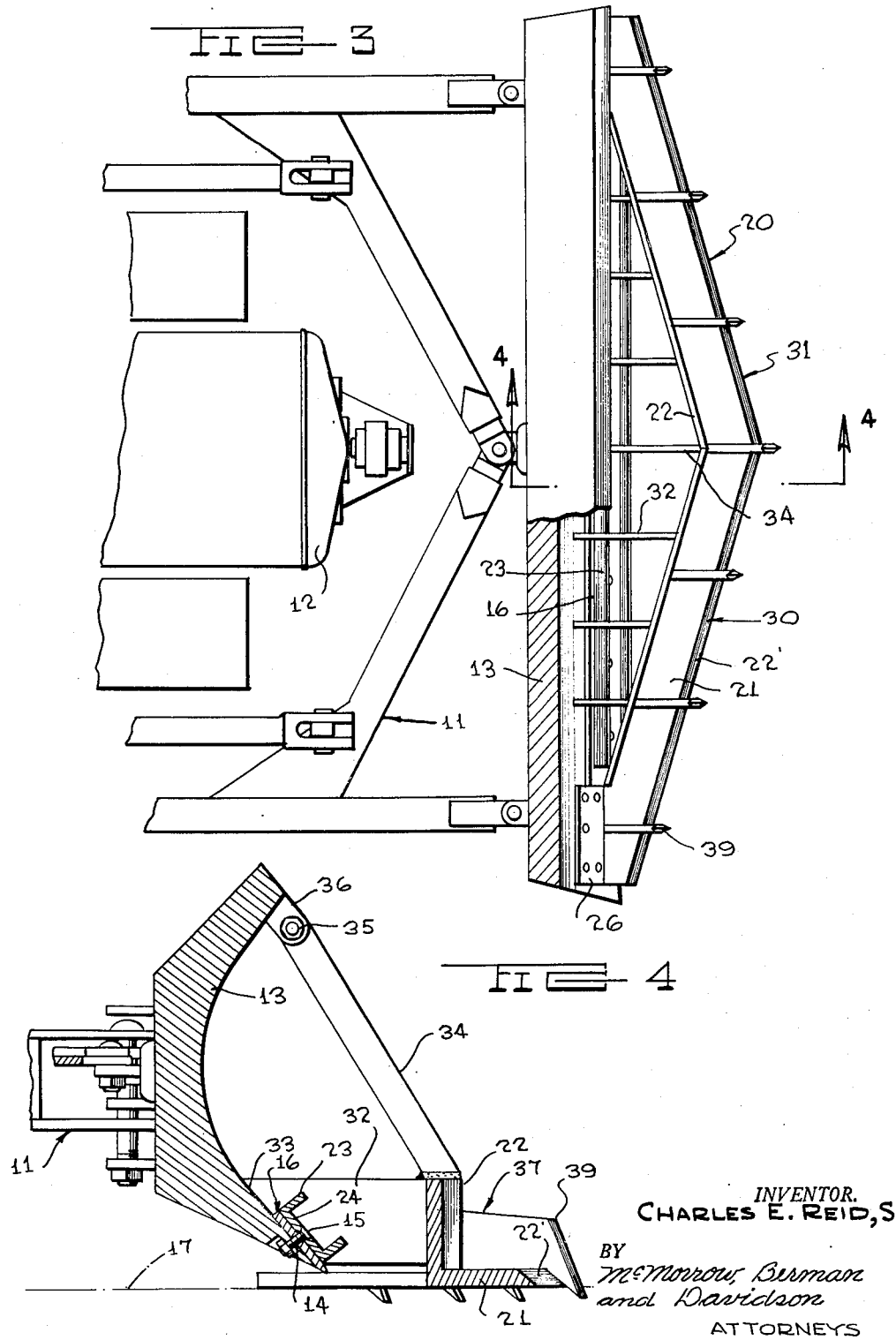

Patented Oct. 28, 1952

2,615,262

UNITED STATES PATENT OFFICE 2,615,262

CUTTING ATTACHMENT FOR LAND-CLEARING EQUIPMENT

Charles Eckford Reid, Sr., Greenville, Miss.

Application September 8, 1950, Serial No. 183,847

2 Claims. (Cl. 37—2)

This invention relates to cutters for land-clearing equipment, and more particularly to a cutting attachment for a bulldozer.

An object of this invention is to provide a cutting attachment for a bulldozer which is particularly adapted to effectively clear swaths of land of underbrush, relatively large obstructions and the like.

Another object of this invention is to provide a cutting attachment which is particularly adapted for securement forwardly of and to the moldboard of a bulldozer.

A further object of this invention is to provide a cutting attachment for securement forwardly of the moldboard of a tractor which is adapted to maintain the conventional cutting blade of the moldboard out of contact with the ground surface to be traversed, to thereby effectively eliminate large accumulations of dirt in front of the moldboard.

A still further object of this invention is to provide a cutting attachment for a bulldozer which is provided with means for maintaining the cutting edge of the attachment from upward displacement upon contact with obstructions as the bulldozer traverses a ground surface to be cleared.

A still further object of this invention is to provide a cutting attachment for a bulldozer which is relatively simple in structure and cheap to manufacture.

The above and still further objects and advantages of the present invention will become apparent upon consideration of the following detailed description of the invention when taken in conjunction with the accompanying drawings, wherein:

Figure 1 is a side elevational view of the cutting attachment of the present invention, shown connected to a bulldozer;

Figure 2 is a front elevational view, with parts broken away and shown in section, of the cutting attachment of the present invention;

Figure 3 is a top plan view, with parts broken away and shown in section, of the cutting attachment shown in Figures 1 and 2; and Figure 4 is an enlarged sectional view taken substantially along the line 4—4 of Figure 3.

Referring now more particularly to the drawings, wherein like reference numerals have been used throughout the several views to designate like parts, there is shown the cutting attachment of the present invention, generally designated by the reference numeral 10, supported on the bulldozer 11. The bulldozer is of conventional structure and embodies a mobile body 12 and a transversely extending, vertically disposed moldboard 13 positioned forwardly of the body 12 and supported thereon. The moldboard 13 is provided with a plurality of longitudinally spaced pairs of apertures 14 for effecting the securement of the conventional three-piece blade, generally designated by the reference numeral 16, contiguous to and longitudinally of the lower edge of the moldboard 13.

The cutting attachment 10 embodies a frame 20 which is positioned forwardly of and in spaced relation with respect to the moldboard and includes a horizontally disposed section 21 and a vertically disposed section 22. As clearly shown in Figures 1 and 4, the horizontally disposed section 21 is adapted to traverse the ground surface 17 to be cleared and has its leading edge provided with a downwardly beveled cutting edge 22'.

Positioned rearwardly of the frame 20 and secured thereto is a channel-shaped attachment bar 23 which is adapted to be positioned in confronting and abutting relation with respect to the intermediate section of the three-piece blade 16 of the moldboard 13. The bight of the channel-shaped attachment bar 23 is provided with an aperture 24 for the extension therethrough of the bolts 15, to thereby fixedly secure the assembly of the channel bar 23, the intermediate section of the blade 16, and the moldboard 13 together, as clearly illustrated in Figure 4. It is to be noted that the ends of the channel bar 23 terminate at a point adjacent to and spaced inwardly from the ends of the frame 20.

Carried by the frame 20 contiguous to and spaced from the ends of the attachment bar 23 are the attachment plates 26, 27 which are provided with bolt-receiving apertures, generally designated by the reference numeral 28. As clearly shown in Figure 3, the attachment plates 26, 27 are rearwardly offset with respect to the attachment bar 23 and accordingly, upon removal of the end sections of the blade 16, the attachment plates 26, 27 can be brought into a position abutting and confronting the adjacent surfaces of the moldboard 13. Suitable bolts may be employed to effect the securement of the attachment plates 26, 27 to the moldboard 13. Accordingly, the attachment plates 26, 27 cooperate with the attachment bar 23 to support the cutting attachment on the moldboard in a position to maintain the lower end of the latter out of engagement with the ground surface 17. Since the lower cutting edge of the intermediate section of the blade 16 is maintained out of contact with the ground surface 17 to be traversed, the tendency for large accumulations of dirt to collect in front of the moldboard 13 is effectively eliminated.

As clearly shown in Figure 3, the frame 20 includes a pair of rearwardly diverging legs 30, 31 which have their divergent ends terminating contiguous to and beneath the moldboard 13, and have their convergent ends connected together substantially along the longitudinal center line of the mobile body 12 of the bulldozer 11. To impart rigidity to the securement of the frame 20 to the attachment bar 23, a plurality of transversely extending, spaced, rib-shaped supporting plates 32 are secured between the vertical section 22 of the frame 20 and the attachment bar 23. It is to be noted that the rearwardly extending end of each of the supporting plates 32 projects beyond the attachment bar 23 and is shaped to conform to the adjacent surfaces of the moldboard 13, as designated by the reference numeral 33, Figure 4, to bear against the latter and to cooperate with the attachment bar and plates in maintaining the frame 20 in the desired position with respect to the ground surface 17.

Carried by the frame 20 is an upwardly and rearwardly inclining brace bar 34 which has one end secured to the vertical section 22 of the frame 20 at the juncture of the divergent legs 30, 31 and has the other end adapted for securement to the moldboard 13 contiguous to the upper end thereof. The securement of the brace bar 34 to the moldboard 13 is effected by means of a bolt 35 which extends transversely through a depending extension 36 provided on the moldboard 13, as clearly illustrated in Figure 4.

Secured to the frame 20 and engaging the ground surface 17 are a plurality of teeth, generally designated by the reference numeral 37 for maintaining the cutting edge 21 of the frame 20 against upward displacement upon contact with obstructions as the frame traverses a ground surface to be cleared. As clearly illustrated in Figure 4, each of the teeth 37 includes a depending nose 38 which projects forwardly and downwardly of the cutting edge 22 of the frame 20. The teeth 37 are arranged at intervals along the legs 30, 31 of the frame 20, and each has its leading edge provided with a cutting surface 39.

In actual use, to effect the securement of the cutting attachment 10 to the bulldozer 11, it is merely necessary to remove the end adjacent sections of the blade 16 from their supported positions upon the moldboard 13. Upon the removal of several of the bolts holding the intermediate section of the blade 16, the attachment bar 23 is brought into confronting and abutting relation with respect to the intermediate section of the blade 16, while the attachment plates 26, 27 are brought into confronting and abutting relation with respect to the adjacent portions of the moldboard 13, whereupon the bolts may be extended through the attachment bar and plates to effect the securement of the cutting attachment to the moldboard 13 of the bulldozer 11. The simplicity of the manner of attaching the cutting attachment to the bulldozer particularly adapts the device for use in conjunction with any one of several types of bulldozers. Once the assembly of the cutting attachment to the bulldozer has been effected, the attachment will effectively clear relatively wide swaths of land of underbrush, relatively large obstructions and the like, as the bulldozer traverses the land.

Although only one embodiment of the cutting attachment of the present invention has been described, it is readily apparent that numerous modifications can be made without departing from the spirit of the invention as set forth in the appended claims.

What I claim is:

1. A cutting attachment for a bulldozer including a mobile body and a vertically disposed moldboard arranged transversely and forwardly of said body and supported thereon comprising a frame adapted to be positioned forwardly of and in parallel spaced relation with respect to said moldboard adjacent the lower end of the latter, said frame including a horizontally disposed section adapted to traverse a ground surface to be cleared and a vertically disposed section projecting from the trailing edge of said horizontally disposed section, the leading edge of said horizontally disposed section being provided with a cutting edge, an upstanding attachment bar adapted to be arranged in confronting and abutting relation with respect to said moldboard and provided with means for securement to the latter, spaced upstanding supporting plates extending between and secured to the vertically disposed section of said frame and said attachment bar, and an upstanding brace bar having the lower end fixed to the upper end of the vertically disposed section of said frame and having the upper end provided with means for attachment to the moldboard adjacent the upper end thereof.

2. A cutting attachment for a bulldozer including a mobile body and a vertically disposed moldboard arranged transversely and forwardly of said body and supported thereon comprising a frame adapted to be positioned forwardly of and in parallel spaced relation with respect to said moldboard adjacent the lower end of the latter, said frame including a horizontally disposed section adapted to traverse a ground surface to be cleared and a vertically disposed section projecting from the trailing edge of said horizontally disposed section, the leading edge of said horizontally disposed section being provided with a cutting edge, an upstanding attachment bar adapted to be arranged in confronting and abutting relation with respect to said moldboard and provided with means for securement to the latter, spaced upstanding supporting plates extending between and secured to the vertically disposed sections of said frame and said attachment bar, an upstanding brace bar having the lower end fixed to the upper end of the vertically disposed section of said frame and having the upper end provided with means for attachment to the moldboard adjacent the upper end thereof, and a plurality of upstanding teeth arranged at intervals along and projecting forwardly and downwardly of the cutting edge of the vertically disposed section of said frame and fixedly secured to the vertically disposed and horizontally disposed sections of said frame for maintaining said cutting edge against upward displacement upon contact with obstructions.

CHARLES ECKFORD REID, Sr.

REFERENCES CITED

The following references are of record in the file of this patent:

UNITED STATES PATENTS

| Number | Name | Date |
| --- | --- | --- |
| 2,297,677 | Forte | Oct. 6, 1942 |
| 2,309,223 | Staring | Jan. 26, 1943 |
| 2,354,560 | Troup | July 25, 1944 |